(12) United States Patent
McLeod et al.

(10) Patent No.: US 8,859,084 B2
(45) Date of Patent: Oct. 14, 2014

(54) MODIFIERS FOR ORIENTED POLYPROPYLENE

(75) Inventors: Michael Allen McLeod, Kemah, TX (US); Juan Jose Aguirre, League City, TX (US); Kenneth S. Laverdure, Plano, TX (US)

(73) Assignee: Fina Technology, Inc., Houston, TX (US)

( * ) Notice: Subject to any disclaimer, the term of this patent is extended or adjusted under 35 U.S.C. 154(b) by 942 days.

(21) Appl. No.: 12/021,646

(22) Filed: Jan. 29, 2008

(65) Prior Publication Data

US 2009/0191388 A1    Jul. 30, 2009

(51) Int. Cl.
*B32B 3/00* (2006.01)
*C08J 5/18* (2006.01)

(52) U.S. Cl.
CPC ............... *C08J 5/18* (2013.01); *C08J 2423/20* (2013.01); *C08J 2467/02* (2013.01); *C08J 2323/12* (2013.01)
USPC .................. 428/201; 428/220; 428/305.5

(58) Field of Classification Search
CPC ........................................................ C08J 5/18
USPC ................................................ 428/201, 220
See application file for complete search history.

(56) References Cited

U.S. PATENT DOCUMENTS

| | | |
|---|---|---|
| 4,271,060 A | 6/1981 | Hubby |
| 4,298,718 A | 11/1981 | Mayr et al. |
| 4,543,399 A | 9/1985 | Jenkins, III et al. |
| 4,544,717 A | 10/1985 | Mayr et al. |
| 4,588,790 A | 5/1986 | Jenkins, III et al. |
| 4,767,735 A | 8/1988 | Ewen et al. |
| 4,865,854 A * | 9/1989 | Larson ............ 426/107 |
| 5,001,205 A | 3/1991 | Hoel |
| 5,028,670 A | 7/1991 | Chinh et al. |
| 5,236,998 A | 8/1993 | Lundeen et al. |
| 5,317,036 A | 5/1994 | Brady, III et al. |
| 5,352,749 A | 10/1994 | DeChillis et al. |
| 5,359,004 A * | 10/1994 | Wilpers et al. ........... 525/194 |
| 5,405,922 A | 4/1995 | DeChillis et al. |
| 5,436,304 A | 7/1995 | Griffin et al. |
| 5,456,471 A | 10/1995 | MacDonald |
| 5,462,999 A | 10/1995 | Griffin et al. |
| 5,525,678 A | 6/1996 | Mink et al. |
| 5,534,593 A * | 7/1996 | Friedman .............. 525/240 |

(Continued)

FOREIGN PATENT DOCUMENTS

EP    0303428 A2    2/1989
JP    2005171230 A    6/2005

(Continued)

OTHER PUBLICATIONS

Office Action issued in JP Patent Application No. 2010/544482 dated Aug. 13, 2013 and English translation thereof (6 pages).

(Continued)

*Primary Examiner* — Gerard Higgins
*Assistant Examiner* — Sathavaram I Reddy

(57) ABSTRACT

A biaxially oriented film that comprises polypropylene and either polytrimethylene terephthalate or polymethylpentene as a cavitating agent in an amount from 5 wt % to 25 wt %. The film has a haze of from 90% to 100% and a gloss of from 10 to 150. The film may be used in food packaging applications and in industrial applications.

15 Claims, 7 Drawing Sheets

Optical microscopy on oriented films. Magnification = 40x

Neat 3270    3270/PMP    3270/PTT

(56) References Cited

U.S. PATENT DOCUMENTS

| | | |
|---|---|---|
| 5,589,555 A | 12/1996 | Zboril et al. |
| 5,616,661 A | 4/1997 | Eisinger et al. |
| 5,627,242 A | 5/1997 | Jacobsen et al. |
| 5,643,847 A | 7/1997 | Walzer, Jr. |
| 5,665,818 A | 9/1997 | Tilston et al. |
| 5,668,228 A | 9/1997 | Chinh et al. |
| 5,677,375 A | 10/1997 | Rifi et al. |
| 5,820,957 A * | 10/1998 | Schroeder et al. ........... 428/40.1 |
| 5,945,366 A | 8/1999 | Kataoka et al. |
| 6,143,686 A | 11/2000 | Vizzini et al. |
| 6,147,173 A | 11/2000 | Holtcamp |
| 6,180,735 B1 | 1/2001 | Wenzel |
| 6,183,856 B1 | 2/2001 | Amon |
| 6,194,060 B1 | 2/2001 | Amon et al. |
| 6,207,606 B1 | 3/2001 | Lue et al. |
| 6,211,105 B1 | 4/2001 | Holtcamp |
| 6,228,795 B1 | 5/2001 | Vizzini |
| 6,242,545 B1 | 6/2001 | Jejelowo et al. |
| 6,245,705 B1 | 6/2001 | Kissin |
| 6,245,868 B1 | 6/2001 | Agapiou et al. |
| 6,248,845 B1 | 6/2001 | Loveday et al. |
| 6,271,323 B1 | 8/2001 | Loveday et al. |
| 6,274,684 B1 | 8/2001 | Loveday et al. |
| 6,287,743 B1 * | 9/2001 | Oakland et al. ............... 430/201 |
| 6,300,436 B1 | 10/2001 | Agapiou et al. |
| 6,339,134 B1 | 1/2002 | Crowther et al. |
| 6,340,730 B1 | 1/2002 | Murray et al. |
| 6,346,586 B1 | 2/2002 | Agapiou et al. |
| 6,359,072 B1 | 3/2002 | Whaley |
| 6,380,328 B1 | 4/2002 | McConville et al. |
| 6,399,837 B1 | 6/2002 | Wilson et al. |
| 6,420,580 B1 | 7/2002 | Holtcamp et al. |
| 6,534,153 B1 * | 3/2003 | Chu et al. ................... 428/195.1 |
| 6,562,938 B2 | 5/2003 | Haile et al. |
| 6,630,224 B2 * | 10/2003 | Peiffer et al. ................. 428/141 |
| 6,692,823 B2 * | 2/2004 | Kody et al. ................... 428/323 |
| 6,818,276 B2 * | 11/2004 | Bourdelais et al. ........... 428/141 |
| 2002/0034610 A1 | 3/2002 | Perez et al. |
| 2002/0136891 A1 | 9/2002 | Khandpur et al. |
| 2003/0049436 A1 * | 3/2003 | Hager et al. ................. 428/343 |
| 2003/0138612 A1 | 7/2003 | Kody et al. |
| 2003/0175499 A1 | 9/2003 | Phillips |
| 2004/0048084 A1 * | 3/2004 | Rhee et al. ................... 428/515 |
| 2004/0053140 A1 | 3/2004 | Stadler et al. |
| 2004/0126518 A1 * | 7/2004 | Mendes et al. ............... 428/34.8 |
| 2004/0180200 A1 | 9/2004 | Bertamini et al. |
| 2005/0100695 A1 | 5/2005 | Holbert et al. |
| 2005/0282974 A1 * | 12/2005 | Tadros et al. ................. 525/437 |
| 2007/0004813 A1 * | 1/2007 | Shelby et al. ................. 521/134 |
| 2007/0154662 A1 * | 7/2007 | Tanaka et al. ............... 428/32.39 |

FOREIGN PATENT DOCUMENTS

| | | |
|---|---|---|
| WO | 0246845 A1 | 6/2002 |
| WO | 2004050357 A1 | 6/2004 |
| WO | 2004067616 A1 | 8/2004 |
| WO | WO 2005063496 A1 * | 7/2005 |
| WO | 2005097468 A1 | 10/2005 |

OTHER PUBLICATIONS

Communication issued in EP Patent Application No. 09705566.9-1308 dated Sep. 23, 2013 (38 pages).

Shu, Y.C., et al.; Journal of Polymer Research, published online Nov. 13, 2007, p. 131-139.

Total 2274X Polypropylene Data Sheet [online], accessed via the Internet [retrieved on Nov. 14, 2013], URL: <http://www.matweb.com/search/datasheet_print.aspx?matguid=e57332d22b7c4f13b87b95cfc7d499d8>.

* cited by examiner

WVTR for films stretched at 145 °C and 155 °C

Photograph of films stretched at 145°C (ADR=5.0x5.0). From left to right: Neat 3270, 3270/PMP and 3270/PTT Photograph of films stretched at 155°C (ADR=5.0x7.5). From left to right: Neat 3270, 3270/PMP, and 3270/PTT

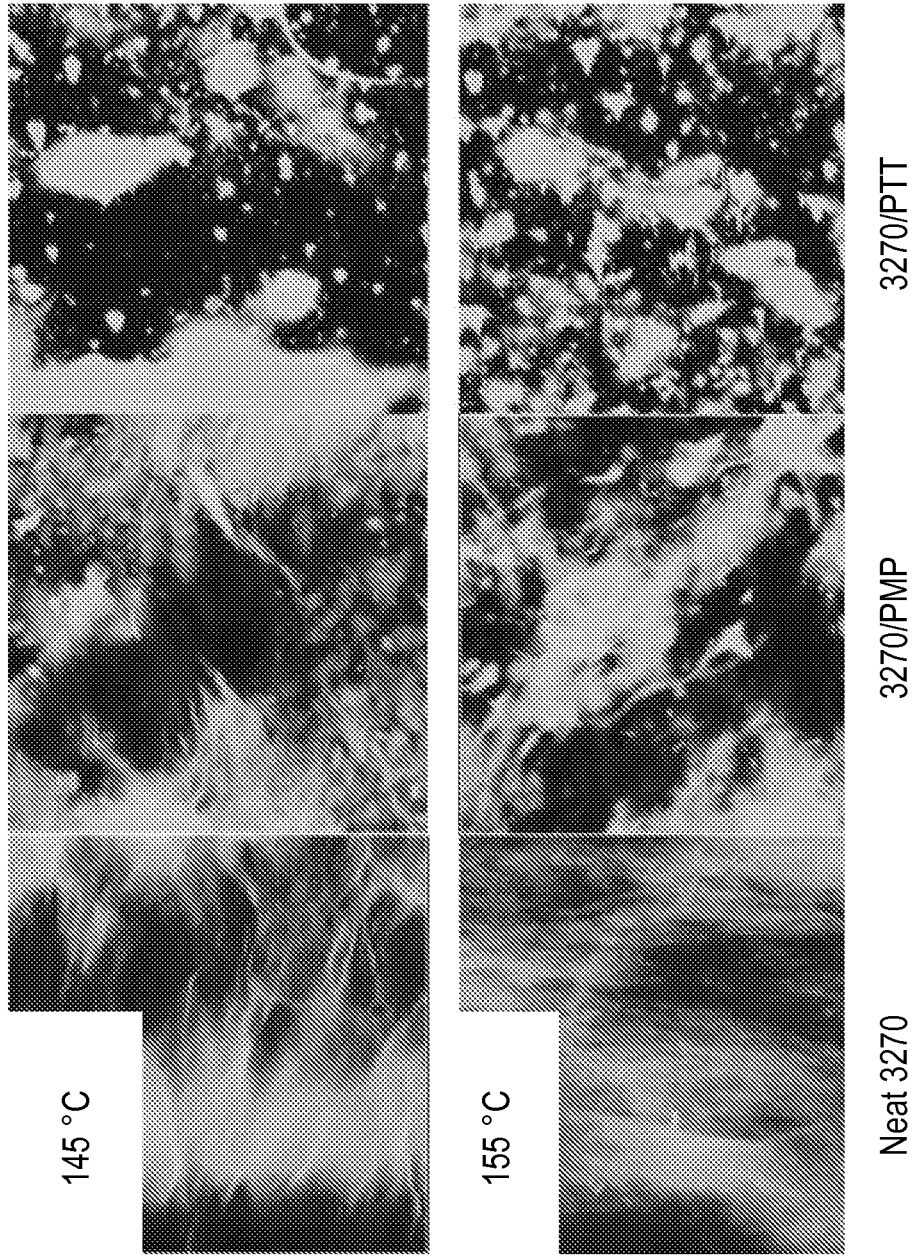

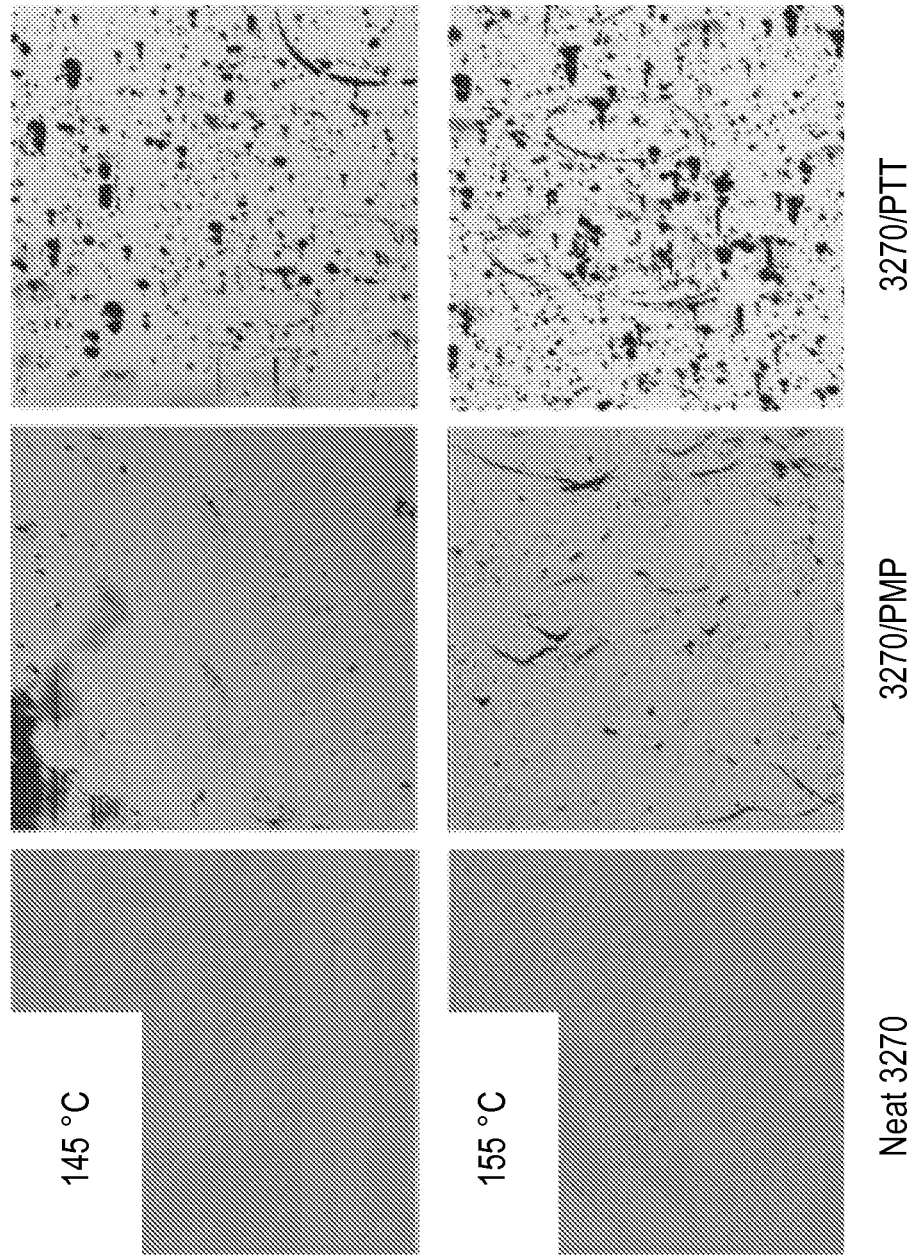

MODIFIERS FOR ORIENTED POLYPROPYLENE

FIELD

This invention relates to polypropylene and more particularly to oriented polypropylene films. Even more particularly, this invention relates to the use of certain modifiers with oriented polypropylene films.

BACKGROUND

Biaxial orientation of polyolefins, particularly polypropylenes, produces films which have applications in the polyolefin film business, for example snack food packaging, cigarette overwrap, electronic components wrapping, packaging tape, and shrink film. The polymers normally employed in the preparation of biaxially oriented films are isotactic homopolymers with high stereoregularity, although on some occasions the use of syndiotactic polymers has been proposed. Also suitable are co-polymers of isotactic polypropylenes with a small content of ethylene (mini-random co-polymers).

Polyolefin films can be prepared as opaque films rather than just as transparent films. In some applications, opacity is a desirable property for such packaging films. Opacity can protect materials from being degraded by light. For example, packaged foodstuff can be subject to deterioration caused by exposure to light, particularly light having a wavelength of up to about 450 nm. Even when a degree of opacity is present in the film, spoilage may occur if the film allows passage of too much light, therefore highly opaque films are the most desirable for these purposes.

The major end-use applications in food packaging were: snack food packaging, bakery products, candy packaging, cheese packaging, coffee & tea packaging, cracker bags, pet food packaging, pasta packaging and others.

The other segment was industrial applications such as: pressure sensitive tapes, labels, capacitor films, audio/video cassettes & CD overwrap, cable insulation and others.

From these two principal markets, opaque films find their niche in two major applications: candy bar wrappers (food packaging application) and labels (industrial applications).

Achieving an opaque film made from polypropylene using resin modifiers is desirable. There exists a need to use materials other than the traditional cavitating agents to obtain opaque film. Such materials may include polymethylpentene and polytrimethylene terphthalate.

SUMMARY

In one embodiment, the present invention includes a film comprising polypropylene and a cavitating agent selected from the group consisting of polymethylpentene (PMP) and polytrimethylene terephthalate (PTT).

In another embodiment, the film of the present invention may be biaxially oriented.

In another embodiment, the cavitating agent is present in an amount from about 5 wt % to about 25 wt %.

In another embodiment, the film of the present invention may have a haze of from about 90% to about 100%.

In another embodiment, the film of the present invention may have a gloss of from about 10 to about 150.

In another embodiment, the film of the present invention is formed into an article of manufacture, including, but not limited to, snack food packaging, bakery products, candy packaging, cheese packaging, coffee & tea packaging, cracker bags, pet food packaging, pasta packaging, pressure sensitive tapes, labels, capacitor films, audio/video cassettes & CD overwrap, and cable insulation.

BRIEF DESCRIPTION OF THE DRAWINGS

FIG. 6 is the AFM height images on oriented films.

FIG. 7 is the AFM phase images on oriented films.

DETAILED DESCRIPTION

Introduction and Definitions

Figure 1:
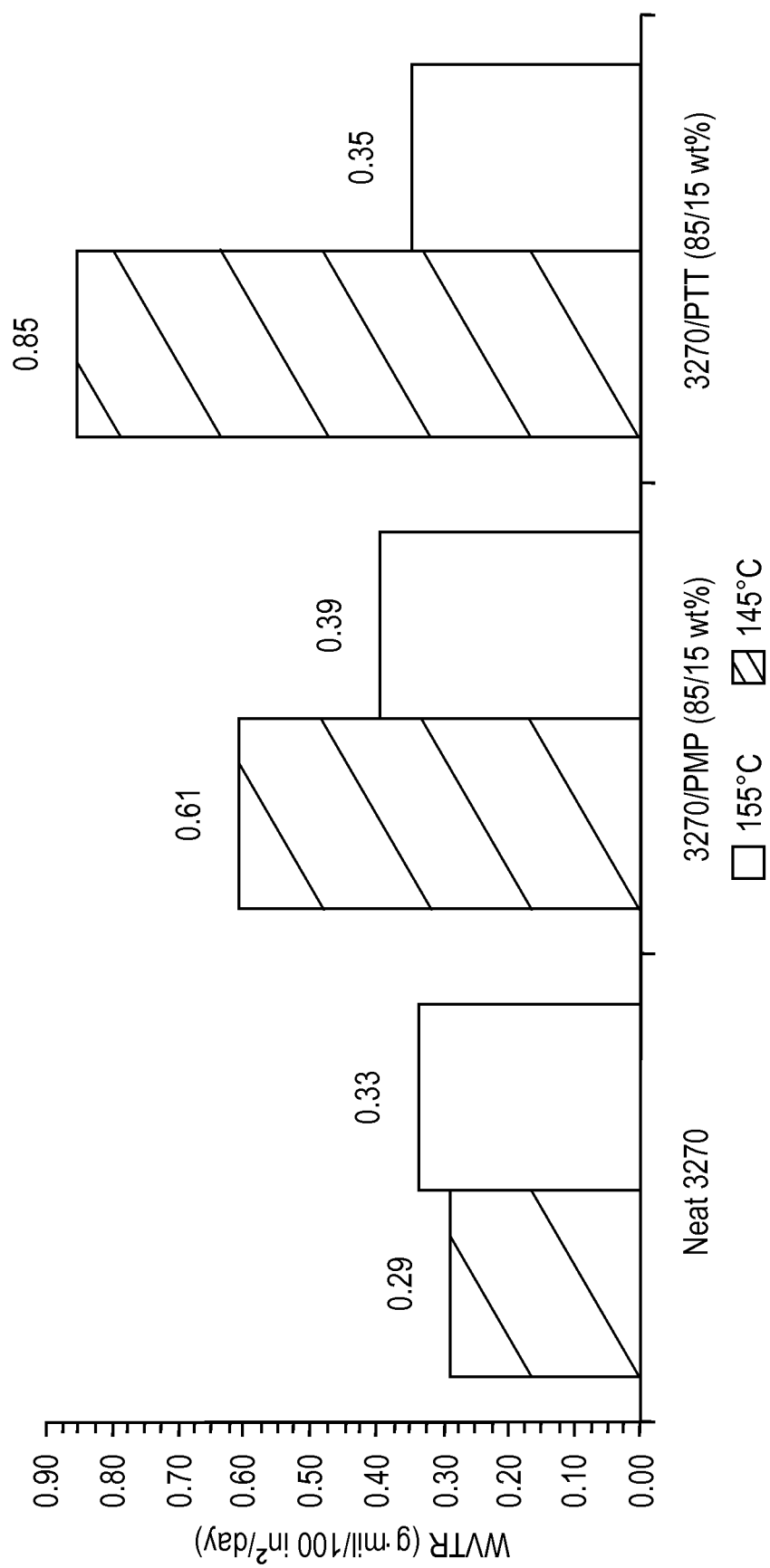
FIG. 1 illustrates the WVTR for films stretched at 145° C. and 155° C.

A detailed description wilt now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof. As used herein, the terms polymethylpentene and poly(4-methylpentene-1) are used interchangeably, and are both referenced as PMP.

Certain polymerization processes disclosed herein involve contacting polyolefin monomers with one or more catalyst systems to form a polymer.

Catalyst Systems

The catalyst systems used herein may be characterized as supported catalyst systems or as unsupported catalyst systems, sometimes referred to as homogeneous catalysts. The catalyst systems may be metallocene catalyst systems, Ziegler-Natta catalyst systems or other catalyst systems known to one skilled in the art for the production of polyolefins, for example. A brief discussion of such catalyst systems is included below, but is in no way intended to limit the scope of the invention to such catalysts.

A. Ziegler-Natta Catalyst System

Ziegler-Natta catalyst systems are generally formed from the combination of a metal component (e.g., a catalyst precursor) with one or more additional components, such as a catalyst support, a cocatalyst and/or one or more electron donors.

A specific example of a catalyst precursor is a metal component generally represented by the formula:

$$MR_x;$$

where M is a transition metal, R is a halogen, an alkoxy, or a hydrocarboxyl group and x is the valence of the transition metal. For example, x may be from 1 to 4. The transition metal of the Ziegler-Natta catalyst compound, as described throughout the specification and claims, may be selected from Groups IV through VIB in one embodiment and selected from titanium, chromium, or vanadium in a more particular embodiment. R may be selected from chlorine, bromine, carbonate, ester, or an alkoxy group in one embodiment. Examples of catalyst precursors include, but are not limited to, $TiCl_4$, $TiBr_4$, $Ti(OC_2H_5)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$.

Those skilled in the art will recognize that a catalyst precursor is "activated" in some way before it is useful for promoting polymerization catalyst. As discussed further below, activation may be accomplished by combining the catalyst precursor with an activator, which is also referred to in some instances as a "cocatalyst." As used herein, the term "Z-N activator" refers to any compound or combination of compounds, supported or unsupported, which may activate a Z-N catalyst precursor. Embodiments of such activators include, but are not limited to, organoaluminum compounds, such as trimethyl aluminum (TMA), triethyl aluminum (TEAl) and triisobutyl aluminum (TiBAl), for example.

The Ziegler-Natta catalyst system may further include one or more electron donors to enhance stereoselectivity, such as internal electron donors and/or external electron donors. Internal electron donors may be used to reduce the atactic form of the resulting polymer, thus decreasing the amount of xylene solubles in the polymer. A polymer is "atactic" when its pendant groups are arranged in a random fashion on both sides of the chain of the polymer (low stereoselectivity). In contrast, a polymer is "isotactic" when all of its pendant groups are arranged on the same side of the chain and "syndiotactic" when its pendant groups alternate on opposite sides of the chain (both are examples of high stereoselectivity). The internal electron donors may include amines, amides, esters, ketones, nitriles, ethers and phosphines in one embodiment. The internal electron donors include, but are not limited to, diethers, succinates and phthalates, such as those described in U.S. Pat. No. 5,945,366, which is incorporated by reference herein, in a more particular embodiment. The internal electron donors include dialkoxybenzenes, such as those described in U.S. Pat. No. 6,399,837, which is incorporated by reference herein, in another embodiment.

External electron donors may be used to further control the amount of atactic polymer produced. The external electron donors may include monofunctional or polyfunctional carboxylic acids, carboxylic anhydrides, carboxylic esters, ketones, ethers, alcohols, lactones, organophosphorus compounds and/or organosilicon compounds. In one embodiment, the external donor may include diphenyldimethoxysilane (DPMS), cyclohexylmethyldimethoxysilane (CMDS), diisopropyldimethoxysilane and/or dicyclopentyldimethoxysilatnc (CPDS). The external donor may be the same or different from the internal electron donor used.

The components of the Ziegler-Natta catalyst system (e.g., catalyst precursor, activator and/or electron donors) may or may not be associated with a support, either in combination with each other or separate from one another. Typical support materials may include a magnesium dihalide, such as magnesium dichloride or magnesium dibromide, for example.

Ziegler-Natta catalyst systems and processes for forming such catalyst systems are described in at least U.S. Pat. No. 4,298,718, U.S. Pat. No. 4,544,717 and U.S. Pat. No. 4,767,735, which are incorporated by reference herein.

B. Metallocene Catalyst System

Metallocene catalysts may be characterized generally as coordination compounds incorporating one or more cyclopentadienyl (Cp) groups (which may be substituted or unsubstituted, each substitution being the same or different) coordinated with a transition metal through π bonding.

The Cp substituent groups may be linear, branched or cyclic hydrocarbyl radicals. The cyclic hydrocarbyl radicals may further form other contiguous ring structures, including, for example indenyl, azulenyl and fluorenyl groups. These additional ring structures may also be substituted or unsubstituted by hydrocarbyl radicals, such as $C_1$ to $C_{20}$ hydrocarbyl radicals.

A specific example of a metallocene catalyst is a bulky ligand metallocene compound generally represented by the formula:

$$[L]_m M[A]_n;$$

where L is a bulky ligand, A is a leaving group, M is a transition metal and m and n are such that the total ligand valency corresponds to the transition metal valency. For example m may be from 1 to 3 and n may be from 1 to 3.

The metal atom "M" of the metallocene catalyst compound, as described throughout the specification and claims, may be selected from Groups 3 through 12 atoms and lanthanide Group atoms in one embodiment, selected from Groups 3 through 10 atoms in a more particular embodiment, selected from Sc, Ti, Zr, Hf, V, Nb, Ta, Mn, Re, Fe, Ru, Os, Co, Rh, Tr, and Ni in yet a more particular embodiment, selected from Groups 4, 5 and 6 atoms in yet a more particular embodiment, Ti, Zr, Hf atoms in yet a more particular embodiment and Zr in yet a more particular embodiment. The oxidation state of the metal atom "M" may range from 0 to +7 in one embodiment, in a more particular embodiment, is +1, +2, +3, +4 or +5 and in yet a more particular embodiment is +2, +3 or +4. The groups bound the metal atom "M" are such that the compounds described below in the formulas and structures are electrically neutral, unless otherwise indicated.

The bulky ligand generally includes a cyclopentadienyl group (Cp) or a derivative thereof. The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

Cp typically includes fused ring(s) or ring systems. The ring(s) or ring system(s) typically include atoms selected from group 13 to 16 atoms, for example, carbon, nitrogen, oxygen, silicon, sulfur, phosphorous, germanium, boron, aluminum and combinations thereof, wherein carbon makes up at least 50% of the ring members. Non-limiting examples include 2-methyl, methyl, 4phenyl indenyl; cyclopentadienyl; cyclopentaphenanthreneyl; indenyl; benzindenyl; fluorenyl; tetrahydroindenyl; octahydrofluorenyl; cyclooctatetraenyl; cyclopentacyclododecene; phenanthrindenyl; 3,4-benzofluorenyl; 9-phenylfluorenyl; 8-H-cyclopent[a]acenaphthylenyl; 7-H-dibenzofluorenyl; indeno[1,2-9]anthrene; thiophenoindenyl; thiophenofluorenyl; hydrogenated versions thereof (e.g., 4,5,6,7-tetrahydroindenyl or $H_4$Ind); substituted versions thereof and heterocyclic versions thereof.

Cp substituent groups may include hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos and combinations thereof. More particular non-limiting examples of alkyl substituents include methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl and the like. Other possible radicals include substituted alkyls and aryls such as, for example, fluoromethyl, fluroethyl, difluoroethyl, iodopropyl, bromohexyl, chlorobenzyl and hydrocarbyl substituted organometalloid radicals including trimethylsilyl, trimethylgermyl, methyldiethylsilyl and the like, halocarbyl-substituted organometalloid radicals including tris(trifluoromethyl)silyl, methylbisedifluoromethyl)silyl, bromomethyldimethylgermyl and the like, disubstituted boron radicals including dimethylboron for example, disubstituted Group 15 radicals including dimethylamine, dimethylphosphine, diphenylamine, methylphenylphosphine and Group 16 radicals including methoxy, ethoxy, propoxy, phenoxy, methylsulfide and ethylsulfide. Other substituents R include olefins, such as but not limited to, olefinically unsaturated substituents including vinyl-terminated ligands, for example 3-butenyl, 2-propenyl, 5-hexenyl and the like. In one embodiment, at least two R groups, two adjacent R groups in one embodiment, are joined to form a ring structure having from 3 to 30 atoms selected from carbon, nitrogen, oxygen, phosphorous, silicon, germanium, aluminum, boron and combinations thereof. Also, a substituent group R group such as 1-butanyl, may form a bonding association to the element M.

Each anionic leaving group is independently selected and may include any leaving group, such as halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, $C_1$ to $C_{12}$ heteroatom-containing hydrocarbons and substituted derivatives thereof, hydride, halogen ions, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls and $C_7$ to $C_{18}$ fluoroalkylaryls in yet a more particular embodiment, hydride, chloride, fluoride, methyl, phenyl, phenoxy, benzoxy, tosyl, fluoromethyls and fluorophenyls in yet a more particular embodiment, $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls, $C_1$ to $C_{12}$ heteroatom-containing alkyls, $C_1$ to $C_{12}$ heteroatom-containing aryls and $C_1$ to $C_{12}$ heteroatom-containing alkylaryls in yet a more particular embodiment, chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls and halogenated $C_7$ to $C_{18}$ alkylaryls in yet a more particular embodiment, fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls) in yet a more particular embodiment and fluoride in yet a more particular embodiment.

Other non-limiting examples of leaving groups include amines, phosphines, ethers, carboxylates, dienes, hydrocarbon radicals having from 1 to 20 carbon atoms, fluorinated hydrocarbon radicals (e.g., —$C_6F_5$ (pentafluorophenyl)), fluorinated alkylcarboxylates (e.g., $CF_3C(O)O^-$), hydrides, halogen ions and combinations thereof, Other examples of leaving groups include alkyl groups such as cyclobutyl, cyclohexyl, methyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like. In one embodiment, two or more leaving groups form a part of a fused ring or ring system.

L and A may be bridged to one another. A bridged metallocene, for example may, be described by the general formula:

$$XCp^ACp^BMA_n;$$

wherein X is a structural bridge, $Cp^A$ and $Cp^B$ each denote a cyclopentadienyl group, each being the same or different and which may be either substituted or unsubstituted, M is a transition metal and A is an alkyl, hydrocarbyl or halogen group and n is an integer between 0 and 4, and either 1 or 2 in a particular embodiment.

Non-limiting examples of bridging groups (X) include divalent hydrocarbon groups containing at least one Group 13 to 16 atom, such as but not limited to, at least one of a carbon, oxygen, nitrogen, silicon, aluminum, boron, germanium, tin and combinations thereof; wherein the heteroatom may also be $C_1$ to $C_{12}$ alkyl or aryl substituted to satisfy neutral valency. The bridging group may also contain substituent groups as defined above including halogen radicals and iron. More particular non-limiting examples of bridging groups are represented by $C_1$ to $C_6$ alkylenes, substituted $C_1$ to $C_6$ alkylenes, oxygen, sulfur, $R_2C=$, $R_2Si=$, $—Si(R)_2Si(R_2)—$ and $R_2Ge=$, $RP=$ (wherein "=" represents two chemical bonds), where R is independently selected from the group hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms and halogen radicals and wherein two or more Rs may be joined to form a ring or ring system. In one embodiment, the bridged metallocene catalyst component has two or more bridging groups (X).

As used herein, the term "metallocene activator" is defined to be any compound or combination of compounds, supported or unsupported, which may activate a single-site catalyst compound (e.g., metallocenes, Group 15 containing catalysts, etc.) Typically, this involves the abstraction of at least one leaving group (A group in the formulas/structures above, for example) from the metal center of the catalyst component. The catalyst components of the present invention are thus activated towards olefin polymerization using such activators. Embodiments of such activators include Lewis acids such as cyclic or oligomeric polyhydrocarbylaluminum oxides and so called non-coordinating ionic activators ("NCA"), alternately, "ionizing activators" or "stoichiometric activators", or any other compound that may convert a neutral metallocene catalyst component to a metallocene cation that is active with respect to olefin polymerization.

More particularly, it is within the scope of this invention to use Lewis acids such as alumoxane (e.g., "MAO"), modified alumoxane (e.g., "TIBAO") and alkylaluminum compounds as activators, to activate desirable metallocenes described herein. MAO and other aluminum-based activators are well known in the art. Non-limiting examples of aluminum alkyl compounds which may be utilized as activators for the catalysts described herein include trimethylaluminum, triethylaluminum, triisobutylaluminum, tri-n-hexylaluminum, tri-n-octylaluminum and the like.

Ionizing activators are well known in the art and are described by, for example, Eugene You-Xian Chen & Tobin J. Marks, *Cocatalysts for Metal-Catalyzed Olefin Polymerization: Activators, Activation Processes, and Structure-Activity*

Relationships 100(4) CHEMICAL REVIEWS 1391-1434 (2000). Examples of neutral ionizing activators include Group 13 tri-substituted compounds, in particular, tri-substituted boron, tellurium, aluminum, gallium and indium compounds and mixtures thereof (e.g., tri(n-butyl)ammonium tetrakispentafluorophenyl)boron and/or trisperfluorophenyl boron metalloid precursors). The three substituent groups are each independently selected from alkyls, alkenyls, halogen, substituted alkyls, aryls, arylhalides, alkoxy and halides. In one embodiment, the three groups are independently selected from the group of halogen, mono or multicyclic (including halosubstituted) aryls, alkyls, alkenyl compounds and mixtures thereof. In another embodiment, the three groups are selected from the group alkenyl groups having 1 to 20 carbon atoms, alkyl groups having 1 to 20 carbon atoms, alkoxy groups having 1 to 20 carbon atoms, aryl groups having 3 to 20 carbon atoms (including substituted aryls) and combinations thereof. In yet another embodiment, the three groups are selected from the group alkyls having 1 to 4 carbon groups, phenyl, naphthyl and mixtures thereof. In yet another embodiment, the three groups are selected from the group highly halogenated alkyls having 1 to 4 carbon groups, highly halogenated phenyls, highly halogenated naphthyls and mixtures thereof. By "highly halogenated", it is meant that at least 50% of the hydrogens are replaced by a halogen group selected from fluorine, chlorine and bromine. In yet another embodiment, the neutral stoichiometric activator is a tri-substituted Group 13 compound comprising highly fluorided aryl groups, the groups being highly fluorided phenyl and highly fluorided naphthyl groups.

The activators may or may not be associated with or bound to a support, either in association with the catalyst component (e.g., metallocene) or separate from the catalyst component, such as described by Gregory G. Hlatky, *Heterogeneous Single-Site Catalyst for Olefin Polymerization* 100(4) CHEMICAL REVIEWS 1347-1374 (2000).

Metallocene Catalysts may be supported or unsupported. Typical support materials may include talc, inorganic oxides, clays and clay minerals, ion-exchanged layered compounds, diatomaceous earth compounds, zeolites or a resinous support material, such as a polyolefin.

Specific inorganic oxides include, but are not limited to, silica, alumina, magnesia, titania and zirconia, for example. The inorganic oxides used as support materials may have an average particle size of from 30 microns to 600 microns or from 30 microns to 100 microns, a surface area of from 50 $m^2/g$ to 1,000 $m^2/g$ or from 100 $m^2/g$ to 400 $m^2/g$ and a pore volume of from 0.5 cc/g to 3.5 cc/g or from 0.5 cc/g to 2 cc/g. Desirable methods for supporting metallocene ionic catalysts are described in U.S. Pat. Nos. 5,643,847; 09,184,358 and 09,184,389, which are incorporated by reference herein.

Polymerization Processes

As indicated elsewhere herein, catalyst systems are used to make polyolefin compositions. Once the catalyst system is prepared, as described above and/or as known to one skilled in the art, a variety of processes can be carried out using that composition. Among the varying approaches that can be used include procedures set forth in U.S. Pat. No. 5,525,678, incorporated by reference herein. The equipment, process conditions, reactants, additives and other materials will of course vary in a given process, depending on the desired composition and properties of the polymer being formed. For example, the processes of U.S. Pat. No. 6,420,580, U.S. Pat. No. 6,380,328, U.S. Pat. No. 6,359,072, U.S. Pat. No. 6,346,586, U.S. Pat. No. 6,340,730, U.S. Pat. No. 6,339,134, U.S. Pat. No. 6,300,436, U.S. Pat. No. 6,274,684, U.S. Pat. No. 6,271,323, U.S. Pat. No. 6,248,845, U.S. Pat. No. 6,245,868, U.S. Pat. No. 6,245,705, U.S. Pat. No. 6,242,545, U.S. Pat. No. 6,211,105, U.S. Pat. No. 6,207,606, U.S. Pat. No. 6,180,735 and U.S. Pat. No. 6,147,173 may be used and are incorporated by reference herein.

The catalyst systems described above can be used in a variety of polymerization processes, over a wide range of temperatures and pressures. The temperatures may be in the range of from about −60° C. to about 280° C., or from about 50° C. to about 200° C. and the pressures employed may be in the range of from 1 atmosphere to about 500 atmospheres or higher.

Polymerization processes may include solution, gas phase, slurry phase, high pressure processes or a combination thereof.

In certain embodiments, the process of the invention is directed toward a solution, high pressure, slurry or gas phase polymerization process of one or more olefin monomers having from 2 to 30 carbon atoms, or from 2 to 12 carbon atoms or from 2 to 8 carbon atoms, such as ethylene, propylene, butene, pentene, methylpentene, hexene, octene and decene. Other monomers include ethylenically unsaturated monomers, diolefins having from 4 to 18 carbon atoms, conjugated or nonconjugated dienes, polyenes, vinyl monomers and cyclic olefins. Non-limiting monomers may include norbornene, norbornadiene, isobutylene, isoprene, vinylbenzocyclobutane, styrenes, alkyl substituted styrene, ethylidene norbornene, dicyclopenitadiene, and cyclopentene. In one embodiment, a copolymer is produced, such as propylene/ethylene, or a terpolymer is produced. Examples of solution processes are described in U.S. Pat. No. 4,271,060, U.S. Pat. No. 5,001,205, U.S. Pat. No. 5,236,998 and U.S. Pat. No. 5,589,555, which are incorporated by reference herein.

One example of a gas phase polymerization process generally employs a continuous cycle, wherein a cycling gas stream (otherwise known as a recycle stream or fluidizing medium) is heated in a reactor by heat of polymerization. The heat is removed from the recycle stream in another part of the cycle by a cooling system external to the reactor. The gaseous stream containing one or more monomers may be continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. No. 4,543,399, U.S. Pat. No. 4,588,790, U.S. Pat. No. 5,028,670, U.S. Pat. No. 5,317,036, U.S. Pat. No. 5,352,749, U.S. Pat. No. 5,405,922, U.S. Pat. No. 5,436,304, U.S. Pat. No. 5,456,471, U.S. Pat. No. 5,462,999, U.S. Pat. No. 5,616,661 and U.S. Pat. No. 5,668,228, which are incorporated by reference herein.)

The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C. Other gas phase processes contemplated by the process includes those described in U.S. Pat. No. 5,627,242, U.S. Pat. No. 5,665,818 and U.S. Pat. No. 5,677,375, which are incorporated by reference herein.

Slurry processes generally include forming a suspension of solid, particulate polymer in a liquid polymerization medium, to which monomers and optionally hydrogen, along with catalyst, are added. The suspension (which may include diluents) can be intermittently or continuously removed from the reactor where the volatile components can be separated from the polymer and recycled, optionally after a distillation, to the reactor. The liquefied diluent employed in the polymerization medium is typically an alkane having from 3 to 7 carbon atoms, such as a branched alkane. The medium employed is generally liquid under the conditions of polymerization and relatively inert. Such as hexane or isobutane.

A slurry process or a bulk process (e.g., a process without a diluent) may be carried out continuously in one or more loop reactors. The catalyst, as a slurry or as a dry free flowing powder, can be injected regularly to the reactor loop, which can itself be filled with circulating slurry of growing polymer particles in a diluent. Hydrogen, optionally, may be added as a molecular weight control. The reactor may be maintained at a pressure of from about 27 bar to about 45 bar and a temperature of from about 38° C. to about 121° C., for example. Reaction heat can be removed through the loop wall since much of the reactor is in the form of a double-jacketed pipe. The slurry may exit the reactor at regular intervals or continuously to a heated low pressure flash vessel, rotary dryer and a nitrogen purge column in sequence form removal of the diluent and all unreacted monomer and comonomers. The resulting hydrocarbon free powder can then be compounded for use in various applications. Alternatively, other types of slurry polymerization processes can be used, such stirred reactors is series, parallel or combinations thereof.

Opaque films are typically manufactured by the tenter frame process. The films are opacified by adding a sufficient amount of a particulate filler material that causes cavities or voids to be formed during the orientation process. Generally, the filler should have a particle size between 0.7 and 5 microns. Commonly used particulate voiding fillers are calcium carbonate, silicon dioxide, aluminum silicate, magnesium silicate, etc. Calcium carbonate is the filler most commonly used in the art of opacifying. Certain organic polymer fillers are also known such as nylon, polystyrene and polybutylene terephthalate (PBT). These materials can also act as voiding fillers for the films. The most preferred concentration of the traditional fillers is between 8 to 20%. Preparation of the films of the present invention is completed by any process known to those of ordinary skill in the art.

In addition to the opacifying filler, other non-voiding additives can be added to reduce the light transmittance of the film, such as titanium dioxide (TiO2), which is used as a white pigment between 1 to 5% in concentration typically.

The density of the opaque films can vary within wide limits and depends on the nature and the quantity of the fillers. The lower the density the higher the degree of cavitation. The density is in general within the range from 0.55 to 1.1 g/cm$^3$.

As mentioned above calcium carbonate (CaCO$_3$) is the primary filler used in opaque film formulations as the cavitating agent, and in some cases polybutylene terephtalate (PBT) is used. Some concerns have been mentioned regarding the use of PBT as a filler in U.S. Pat. No. 6,194,060 and U.S. Pat. No. 6,183,856: where it is mentioned that PBT may tend to decompose during extrusion of the film. In the case where PBT decomposes, the deposit may be in the form of an eggshell-like scale on the processing equipment. This scale occasionally breaks up, causing visual defects or breaks in the film in downstream processing. It has been found that a typical line for forming opaque film using PBT can suffer ten or more hours of downtime per month as a result of these scale formation problems and subsequently necessary die clean-ups.

Polymer Product

The polymers produced by the processes described herein can be used in a wide variety of products and end-use applications. The polymers may include polypropylene and polypropylene copolymers.

In certain embodiments, propylene based polymers can be produced using the processes described herein. These polymers include atactic polypropylene, isotactic polypropylene, hemi-isotactic and syndiotactic polypropylene. Other propylene polymers include propylene block or impact copolymers.

In certain embodiments, polytrimethylene terphthalate (PTT) is blended into a propylene based polymer in amounts of from 5 wt % to 25 wt %, based on the total weight of the composition, or from 10 wt % to 15 wt %.

In certain embodiments, polymetthylpentene (PMP) is blended into a propylene based polymer in amounts of from 5 wt % to 25 wt %, based on the total weight of the composition, or from 10 wt % to 15 wt %.

The resulting polymeric blends are then formed into opaque films, as discussed above. These opaque films may have a sheet thickness of from 0.5 mils to 5.0 mils, or 1.5 mils to 3.0 mils, or from 2.0 mils to 2.5 mils.

The film may have a water vapor transmission rate (WVTR), as determined by ASTM F1249, of from 0.5 g·mil/100 in$^2$/day to 2.0 g·mil/100 in$^2$/day or from 0.6 g·mil/100 in$^2$/day to 1.0 g~mil/100 in$^2$/day.

The film may also have a 1% secant modultis (transverse direction), as determined by ASTM D882, of from about 150 kpsi to about 500 kpsi, or from about 200 kpsi to about 400 kpsi, or from about 250 kpsi to about 350 kpsi.

The film may have a haze, as determined using ASTM 1003, of from 90% to about 100%, or from 95% to about 100%, or from 99% to about 100%. The film may have a 45° gloss, as determined using ASTM D523, of from 10 to about 150, or from 20 to about 125, or from about 25 to about 110. The film may have a clarity of from 0% to about 5%, or from 0% to about 2%.

In certain embodiments, the polypropylene used in the polymeric blends may have a melt flow, determined by ASTM D-1238 at 230° C. and 2160 g, of from 1.0 to 6.0 g/10 min, or from 1.5 to 2.5 g/10 min, or from 1.8 to 2.2 g/10 min, or about 2.0 g/10 min. The polypropylene may also have a density, determined by ASTM D-1505, of from 0.890 to 0.950 g/cc, or from 0.895 to 0.930 g/cc, or from 0.900 to 0.920 g/cc, or about 0.910 g/cc. The polypropylene may also have a melting point, determined by Differential Scanning Calorimetry (DSC), of from 145° C. to 175° C., or from 160° C. to 170° C., or about 165° C. The polypropylene may also have a xylene solubles (weight %) of less than 7.0 wt %, or less than 5.0 wt %, or less than 3.0 wt %, or less than 1.0 wt %. Methods for determination of the XS % are known in the art, for example the XS % may be determined in accordance with ASTM D 5492-98. Typically, the XS % in the polymer is indicative of the extent of crystalline polymer formed. In determining the xylene soluble fraction (XS %), the polymer is dissolved in boiling xylene and then the solution cooled to 0° C. which results in the precipitation of the isotactic or crystalline portion of the polymer. The XS % is that portion of the original amount that remained soluble in the cold xylene. The total amount of polymer (100%) is the sum of the xylene soluble fraction and the xylene insoluble fraction.

Product Application

The polymers produced are useful in a variety of end-use applications, such as biaxially oriented films.

The films of the present invention may be used in for example snack food packaging, cigarette overwrap, electronic components wrapping, packaging tape, shrink film, bakery products, candy packaging, cheese packaging, coffee & tea packaging, cracker bags, pet food packaging, pasta packaging and others. The films may also be used as pressure sensitive tapes, labels, capacitor films, audio/video cassettes & CD overwrap, cable insulation and others.

EXAMPLES

The following examples are for illustration purposes only, and are not intended to be limiting.

Three 40 mil sheet formulations were cast for this project. They were neat Total Petrochemicals 3270, an 85/15 wt % blend of 3270/Mitsui DX845, and an 85/15 wt % blend of 3270/Corterra PTT200. Mitsui DX845 is a commercial grade of poly(4-methylpentene-1) (PMP) with a 231° C. melting temperature. Corterra PTT200 is a commercial grade of poly (trimethyl terephthalate) (PTT) with a 225° C. melting temperature. These materials were stretched at two conditions to attempt to induce cavitation. The conditions were selected based on drawability; the maximum drawability was found for one of the blends at a given temperature, then those conditions were used to make the film. Under both temperatures, the 3270/PTT blend failed earliest and therefore defined the a real draw ratio that was used. Details on the stretching conditions are provided in Table 1.

TABLE 1

Stretching conditions for cavitation.

| | | |
|---|---|---|
| Stretch Temperature (° C.) | 145 | 155 |
| Starting Sheet Thickness (mils) | 40 | 40 |
| Preheating Time (sec.) | 45 | 45 |
| Areal Draw Ratio | 5.0 × 5.0 | 5.0 × 7.5 |
| Machine Direction Speed (m/min) | 30 | 30 |
| Trans. Direction Speed (m/min) | 3 | 3 |

The 40 mil sheets were tested for a few properties. Tensile testing established they had similar tensile moduli, ranging from 290 kpsi to 325 kpsi. The blends had slightly lower yield strengths and lower elongations at yield. Neat 3270 sheet had a 45° gloss of 41.7±3.8. The blend sheets had slightly higher gloss values; using PMP increased gloss to 46.4±0.9, while using PTT made the sheet gloss 49.8±1.1.

To evaluate the stretched film, the thickness was measured first. Cavitated film should be significantly thicker than uncavitated film because the voids add volume. With 145° C. stretching, this expectation was borne out. The film containing PTT was 2.5 mils versus 1.5 mils for neat 3270 (Table 2). Film containing PMP was slightly thicker, at 1.74 mils. Stretching at 155° C. did not induce cavitation but did still make opaque films with both blends.

TABLE 2

Film thicknesses measured with the TMI micrometer.

| | Neat 3270 | 3270/DX845 (85/15%) | 3270 Corterra PTT200 (85/15 wt %) |
|---|---|---|---|
| Average Thickness @ 145° C. (mils) | 1.53 ± 0.04 | 1.74 ± 0.11 | 2.50 ± 0.19 |
| Average Thickness @ 155° C. (mils) | 1.11 ± 0.04 | 0.94 ± 0.02 | 0.92 ± 0.01 |

85×85 mm$^2$ square centers were cut from oriented film and weighed to confirm the increase in thickness. Thickness was calculated assuming an additive relationship between densities, with PP at 0.905 g/cm$^3$, PMP at 0.83 g/cm$^3$, and PTT at 1.33 g/cm$^3$. Without cavitation, the films would be expected to have thicknesses ranging from 1.3 to 1.5 mils (Table 3). 3270/PTT200 predicted thickness of 1.33 mils is nearly half that of the experimentally measured 2.50 mils. Such a difference can only be explained by cavitation. For 3270/DX845 film, a prediction of 1.51 mils versus 1.74 mils suggests some cavitation was induced as well, just not as much.

TABLE 3

Center cut weights at 145° C. with estimated film thicknesses without cavitation.

| | Neat 3270 | 3270/DX845 (85/15%) | 3270 Corterra PTT200 (85/15 wt %) |
|---|---|---|---|
| Center Cut Wt (g) | 0.2329 | 0.2477 | 0.2368 |
| Calc. Thick. (mils) | 1.402 | 1.510 | 1.332 |

Water vapor transmission rate (WVTR) results support cavitation at 145° C. Using PMP caused a 100% increase in WVTR, whine PTT increased WVTR by 200% (FIG. 1). Raising the temperature to 155° C. gave all films similar WVTR values. The 3270/PMP blend is ~20% higher, consistent with PMP's higher permeability.

Figure 2:
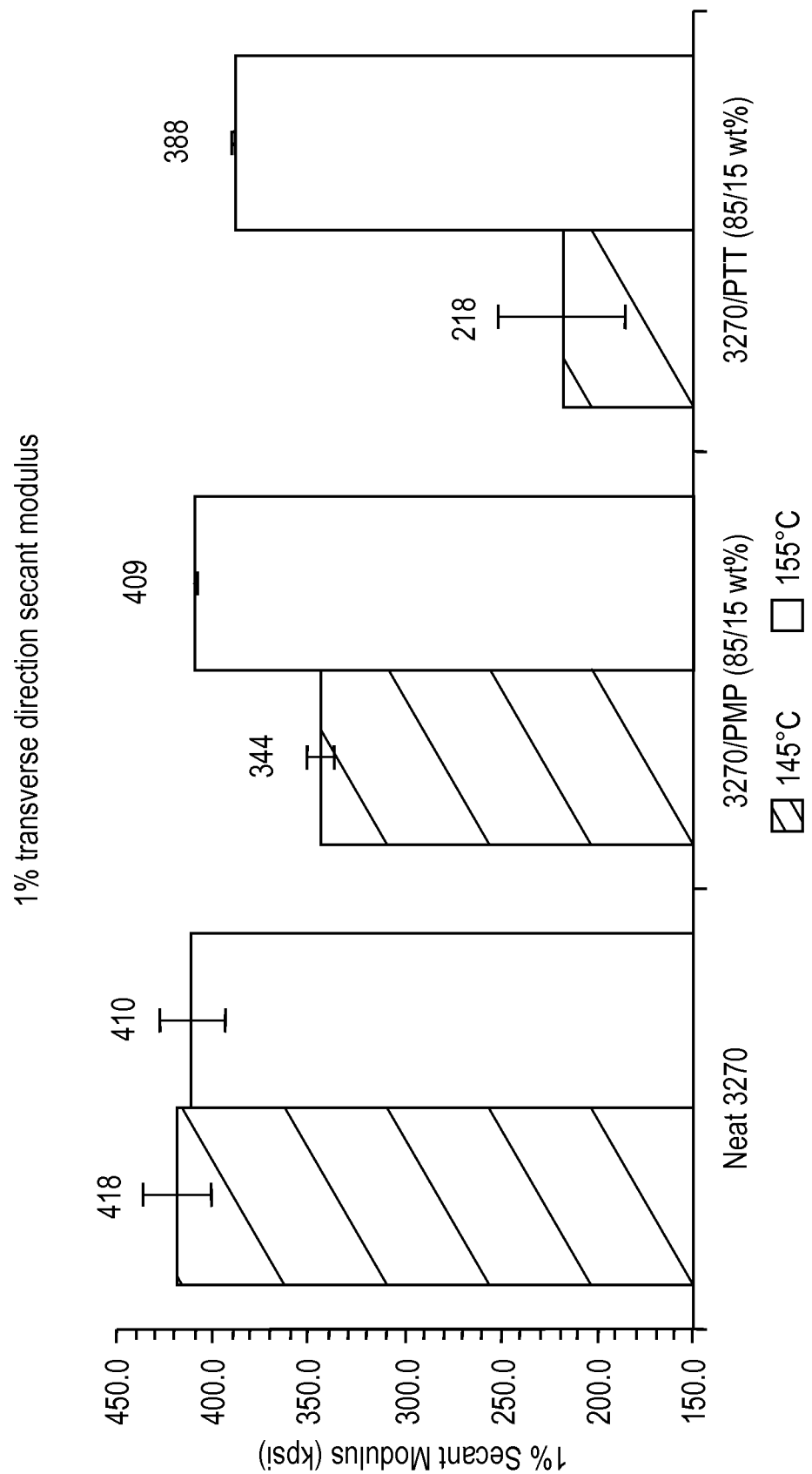
FIG. 2 illustrates the 1% transverse direction secant modulus.

Further affirmation is found in tensile properties. Modulus is lower for the cavitated films, consistent with their increased thickness (FIG. 2). Tensile strength to break is lower as well.

Film optical properties are another key element in cavitated films. Matte surface films require a haze >65% and a gloss <12. Cavitated films tend to be opaque, but the degree of opacity can be important.

Figure 3:
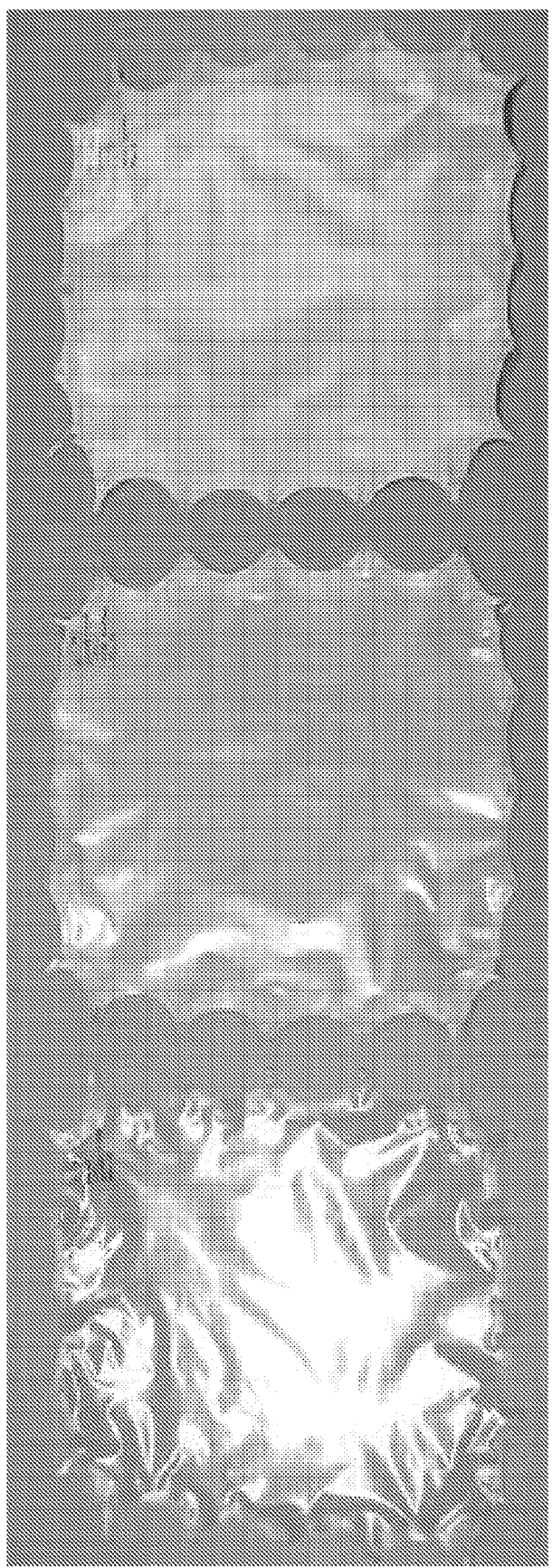
FIG. 3 is a photograph of films stretched at 145° C. (ADR=5.0×5.0).
Figure 4:
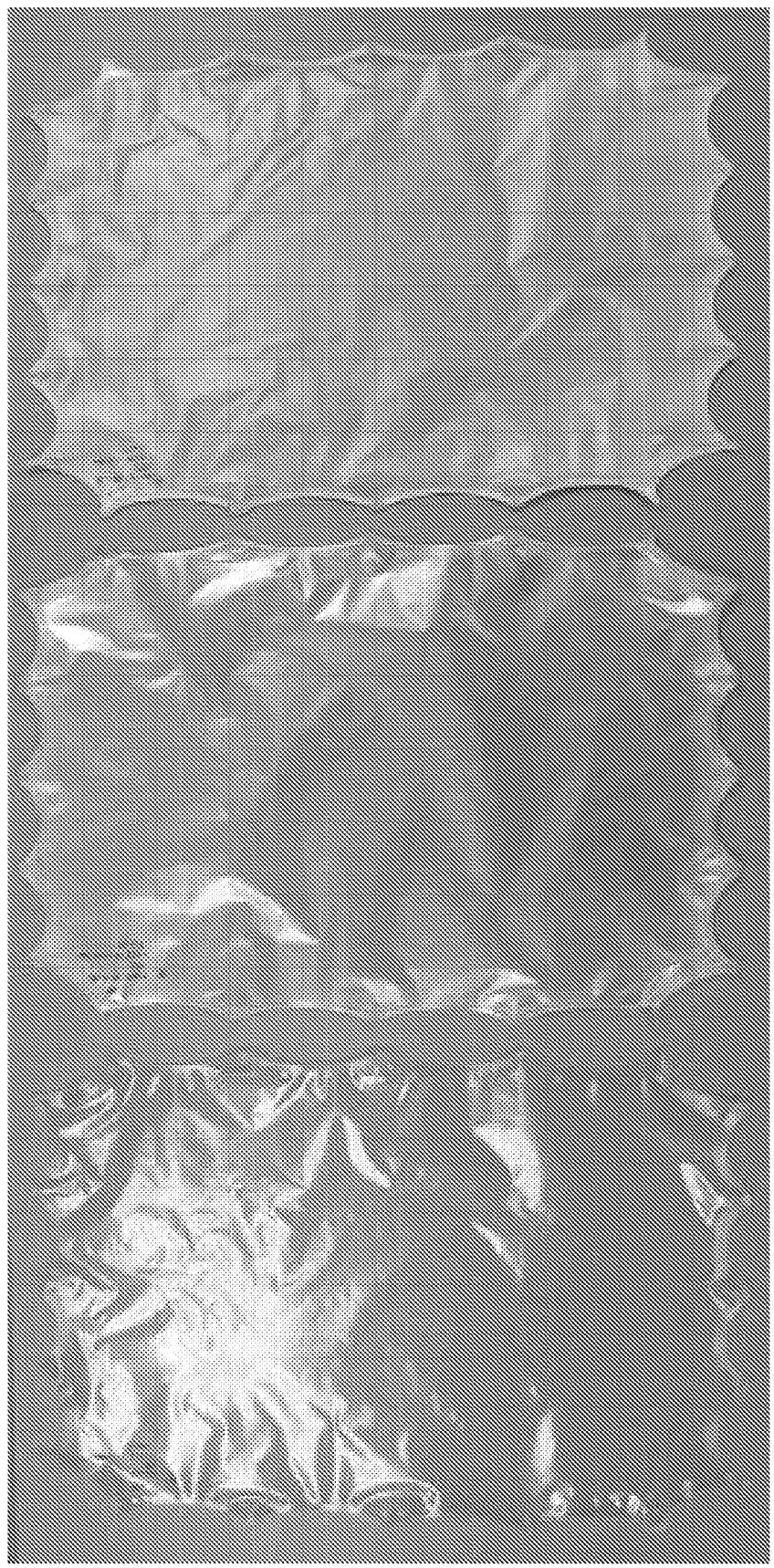
FIG. 4 is a photograph of films stretched at 155° C. (ADR=5.0×7.5).

When stretched at 145° C., light transmittance and clarity are very low (Table 4, FIG. 3). The blends have 100% haze at 145° C. and >90% haze at 155° C., where there is no cavitation and the films are thinner. At both temperatures the blend films are opaque, regardless if they cavitated or not (FIG. 3 and FIG. 4).

TABLE 4

Film optical properties.

| | Transmittance (%) | Haze (%) | Clarity (%) | Gloss (45°) |
|---|---|---|---|---|
| 145° C., ADR = 5.0 × 5.0 | | | | |
| Neat 3270 | 88.4 ± 0.30 | 9.90 ± 1.50 | 83.9 ± 1.77 | 105.6 ± 4.55 |
| 3270/PMP (85/15 wt %) | 25.3 ± 2.49 | 100 | 2.1 ± 2.39 | 110.3 ± 6.15 |
| 3270/PTT (85/15 wt %) | 15.5 ± 1.62 | 100 | 0 | 25.4 ± 1.80 |
| 155° C., ADR = 5.0 × 7.5 | | | | |
| Neat 3270 | 93.1 ± 0.18 | 11.4 ± 0.96 | 82.2 ± 1.05 | 74.3 ± 2.91 |
| 3270/PMP (85/15 wt %) | 58.4 ± 2.45 | 93.8 ± 1.86 | 14.0 ± 2.77 | 73.1 ± 3.06 |
| 3270/PTT (85/15 wt %) | 79.7 ± 4.41 | 95.8 ± 2.33 | 23.6 ± 9.98 | 22.8 ± 2.54 |

Although the neat sheets had similar gloss values, the similarity was lost once they were oriented into film. The 3270/PMP blend has gloss values that match neat 3270 (Table 4). Conversely, 3270/PTT blend consistently has low gloss, making it ideal for matte finish applications (gloss <12). At both temperatures the gloss was in the low to mid twenties (Table 4). Using PTT with impact copolymer or small amounts of matte finish masterbatch could be enough to push the gloss below 12.

Figure 5:
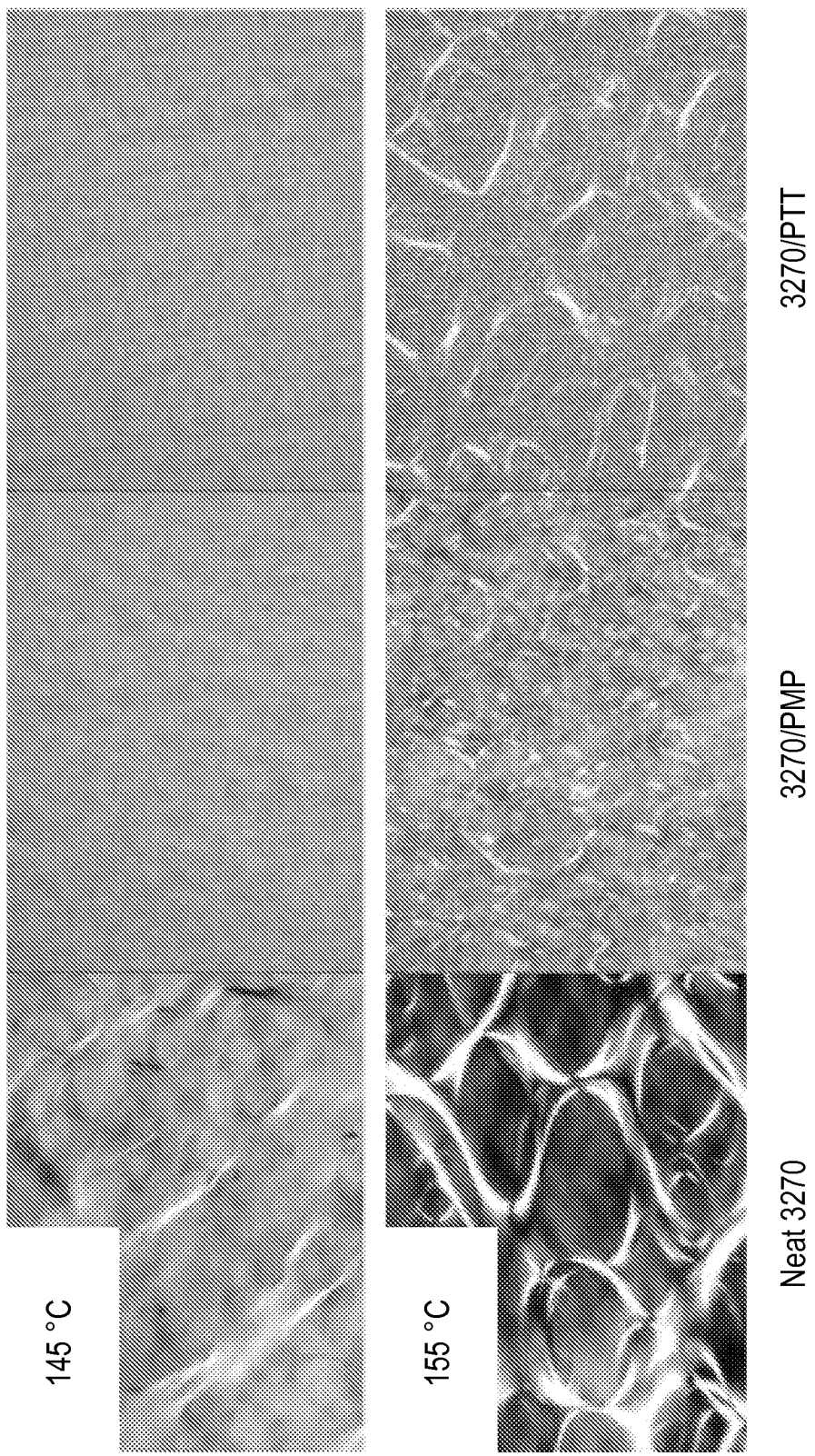
FIG. 5 is the optical microscopy on oriented films.

Optical microscopy provides a closer look at film structure and emphasizes the influence of light transmittance. Defects can be seen in both neat 3270 films, while the blends only show the same defects at 155° C. stretching (FIG. 5). The lower transmission for the 3270/PMP blend is apparent because the wavy defects are more difficult to see. At 145° C., both blends have a nondescript appearance due to their opacity.

For probing much smaller size scales, atomic force microscopy was used. Height images show the relative morphologies between the films (FIG. 6). Neat 3270 has a fibrillar morphology typical of BOPP films. The height range used for neat 3270 was 200 nm. Adding either PMP or PTT created a rougher surface; one that required a 600 nm height range to be used. Both blend components disrupt neat 3270's fibrillar morphology, with PTT appearing more effective. More fibrillar structures remain in the 3270/PMP blends than in the 3270/PTT blends.

Height images were also used to quantify surface roughness. Neat 3270 provided the smoothest surface, followed by the 3270/PMP blend and then the 3270/PTT blend (Table 5). Although the 3270/PMP blend is much rougher than the neat 3270 by AFM measurements, it is not rough enough to decrease gloss (see Table 4). Only when PTT is used does the increased roughness create a much duller oriented film.

TABLE 5

Surface roughness statistics. Averages of three scans on each film.

|  | Neat 3270 | 3270/DX845 (85/15 wt %) | 3270/Corterra PTT200 (85/15 wt %) |
| --- | --- | --- | --- |
| Z-Range @ 145° C. (μm) | 437.45 ± 48.35 | 1715.67 ± 439.58 | 3424.33 ± 342.82 |
| Z-Range @ 155° C. (μm) | 495.73 ± 183.40 | 2112.33 ± 534.35 | 3601.33 ± 510.81 |
| RMS @ 145° C. (μm) | 48.09 ± 8.30 | 195.63 ± 38.20 | 405.12 ± 90.44 |
| RMS @ 155° C. (μm) | 50.14 ± 28.39 | 233.56 ± 25.25 | 335.90 ± 78.34 |
| Ra @ 145° C. (μm) | 38.60 ± 7.34 | 148.14 ± 26.35 | 343.33 ± 74.70 |
| Ra @ 155° C. (μm) | 40.59 ± 24.77 | 179.09 ± 9.92 | 251.48 ± 54.08 |

Z-range: Maximum vertical distance between highest and lowest points.
RMS: The standard deviation of the Z values.
Ra: Mean roughness.

The comparison between PMP and PTT should consider their densities as well. PMP is much less dense than PTT (0.83 g/cm$^3$ vs 1.33 g/cm$^3$), so at equal weight fractions the volume fractions should be 16.1% and 10.7%, respectively. The PTT domains appear more numerous, as round points with increased height.

To further contrast the PMP and PTT domains, phase images are presented in FIG. 7. These images are created from the AFM operating in the tapping mode, where differences ill material surface properties (such as stiffness and chemical composition) cause changes in the energy dissipation at the tip-sample interface. The sharpest contrast comes with the 3270/PTT structures, where the PTT forms circular domains in the PP matrix. These domains are small, most being <5 μm in diameter. The 3270/PMP blend shows less contrast than 3270/PTT (FIG. 7).

PMP dispersion and response to extension stress could differ from PTT as well. 145° C. films often had 20 to 30 μm features embedded in the matrix (see upper left-hand corner of the 3270/PMP tile in FIG. 7). These could be larger PMP domains that stretched affinely with the matrix. PMP is amenable to solid-state stretching under proper processing conditions. Conversely, many of the domains that are resolved in the 155° C. image appear to be <1 μm in diameter. Without being limited to any one particular theory, it is possible that at the hotter temperature, the PMP's modulus was significantly higher than the 3270 matrix modulus, resulting in little PMP deformation.

PMP and PTT had little influence on film shrinkage (Table 6). Films made using PTT tended to shrink slightly more than neat 3270. The results with PMP do not show a consistent trend, but indicate slightly more shrinkage when stretched at 145° C. It generally appears that the 3270 base polymer largely controlled shrinkage.

TABLE 6

Film shrinkage.

|  | MD Shrinkage (%) | TD Shrinkage (%) |
| --- | --- | --- |
| 145° C., ADR = 5.0 × 5.0 | | |
| Neat 3270 | 2.40 | 7.69 |
| 3270/PMP (85/15 wt %) | 3.11 | 8.17 |
| 3270/PTT (85/15 wt %) | 2.63 | 8.41 |
| 155° C., ADR = 5.0 × 7.5 | | |
| Neat 3270 | 1.67 | 4.33 |
| 3270/PMP (85/15 wt %) | 1.67 | 3.85 |
| 3270/PTT (85/15 wt %) | 2.14 | 5.26 |

Using PMP increased permeability by 100% while using PTT increased permeability by 200%. For PTT, these opaque films were dull and have potential in matte finish applications. For PMP, attractive glossy opaque films were made which have potential in specialty applications. Cavitation was sensitive to stretching temperature, A relatively cool temperature was required to promote cavitation. BOPP AFM results showed 3270/PMP blends were smoother than 3270/PTT blends. The PTT domains were clearly seen in phase imaging. PMP domains were not as clearly seen but appeared to be smaller.

While the foregoing is directed to embodiments of the present invention, other and further embodiments of the invention may be devised without departing from the basic scope thereof and the scope thereof is determined by the claims that follow.

What is claimed is:

1. A biaxially oriented film comprising polypropylene; and a cavitating agent consisting of polytrimethylene terephthalate (PTT).

2. The biaxially oriented film of claim 1 having a haze of from about 90% to about 100%.

3. The biaxially oriented film of claim 1 having a gloss of from about 10 to about 150.

4. The biaxially oriented film of claim 1 having a clarity of from 0% to about 5%.

5. The biaxially oriented film of claim 1 having a 1% secant modulus in the range of 150 kpsi to 500 kpsi.

6. The biaxially oriented film of claim 1 having a WVTR of 0.5 to 2.0 g·mil/100 in$^2$/day.

7. The biaxially oriented film of claim 1 having a haze of about 100% and a gloss of about 110.

8. The biaxially oriented film of claim 1 having a matte finish.

9. An article of manufacture comprising the biaxially oriented film of claim 7.

10. The biaxially oriented film of claim 1 having a haze of about 100% and a gloss of about 25.

11. An article of manufacture comprising the biaxially oriented film of claim 1.

12. The article of manufacture of claim 11, wherein said article of manufacture is snack food packaging, bakery products, candy packaging, cheese packaging, coffee & tea packaging, cracker bags, pet food packaging, pasta packaging, pressure sensitive tapes, labels, capacitor films, audio/video cassettes & CD overwrap, and cable insulation.

13. The biaxially oriented film of claim 1, wherein the PTT is present in an amount ranging from 5 wt % to 25 wt %.

14. The biaxially oriented film of claim 1, wherein the PTT is present in an amount ranging from 10 wt % to 15 wt %.

15. The biaxially oriented film of claim 1, wherein the PTT is present in an amount of about 15 wt %.

* * * * *